United States Patent
Burokas et al.

(10) Patent No.: US 7,334,122 B2
(45) Date of Patent: Feb. 19, 2008

(54) SYSTEM FOR AND METHOD OF NETWORK BOOTING OF AN OPERATING SYSTEM TO A CLIENT COMPUTER USING HIBERNATION

(75) Inventors: Gintautas Burokas, Orland Park, IL (US); Kenny Bunch, Chesapeake, VA (US); Robert Lusinsky, Anaheim Hills, CA (US); Marc Sandusky, Aliso Viejo, CA (US); Mike Garelick, Oceanside, CA (US)

(73) Assignee: Ardence, Inc., Waltham, MA (US)

( * ) Notice: Subject to any disclaimer, the term of this patent is extended or adjusted under 35 U.S.C. 154(b) by 50 days.

(21) Appl. No.: 11/199,735

(22) Filed: Aug. 9, 2005

(65) Prior Publication Data
US 2006/0010316 A1  Jan. 12, 2006

Related U.S. Application Data

(63) Continuation of application No. 10/125,265, filed on Apr. 18, 2002, now Pat. No. 6,954,852.

(51) Int. Cl.
G06F 9/00 (2006.01)
G06F 9/24 (2006.01)
G06F 15/177 (2006.01)

(52) U.S. Cl. .............. 713/2; 713/1; 713/100
(58) Field of Classification Search ............ 713/1, 713/2, 100
See application file for complete search history.

(56) References Cited

U.S. PATENT DOCUMENTS

| | | | |
|---|---|---|---|
| 5,280,627 A | 1/1994 | Flaherty et al. | |
| 5,577,210 A | 11/1996 | Abdous et al. | |
| 5,708,820 A | 1/1998 | Park et al. | |
| 5,974,547 A * | 10/1999 | Klimenko .............. | 713/2 |
| 6,101,601 A | 8/2000 | Matthews et al. | |
| 6,108,697 A | 8/2000 | Raymond et al. | |
| 6,209,088 B1 | 3/2001 | Reneris | |
| 6,226,667 B1 | 5/2001 | Matthews et al. | |
| 6,256,673 B1 | 7/2001 | Gayman | |
| 6,487,718 B1 * | 11/2002 | Rodriguez et al. .......... | 717/177 |
| 6,601,096 B1 * | 7/2003 | Lassiter, Jr. ............... | 709/222 |
| 6,816,963 B1 | 11/2004 | Krithivas et al. | |
| 6,954,852 B2 * | 10/2005 | Burokas et al. .............. | 713/2 |
| 2003/0200290 A1 | 10/2003 | Zimmerman et al. | |

OTHER PUBLICATIONS

PCT International Search Report for PCT/US02/12275, filed Apr. 18, 2002.
International Preliminary Examination Report (IPER), from related PCT Application No. PCT/US02/12275, filed Apr. 18, 2002.

* cited by examiner

Primary Examiner—Thomas Lee
Assistant Examiner—Ji H Bae
(74) Attorney, Agent, or Firm—Choate, Hall & Stewart, LLP

(57) ABSTRACT

A system for and method of network booting of an operating system (O/S) on one or more client devices, such as personal computers (PC's), employing a hibernation image. Remote booting of sets of client devices is facilitated by employing virtual disk emulation and, in certain preferred embodiments, broadcasting or multicasting of data residing on a network server which is necessary to appropriately boot and configure the one or more client devices, the data including hibernation, O/S and application files.

30 Claims, 4 Drawing Sheets

SYSTEM FOR AND METHOD OF NETWORK BOOTING OF AN OPERATING SYSTEM TO A CLIENT COMPUTER USING HIBERNATION

CROSS-REFERENCE TO RELATED APPLICATIONS

The present application is a continuation of U.S. patent application Ser. No. 10/125,265, filed Apr. 18, 2002 now U.S. Pat. No. 6,954,852.

FIELD OF THE INVENTION

The present invention relates generally to network booting of an operating system (O/S) on one or more client devices, such as personal computers (PC's), employing a hibernation image. More specifically, the invention facilitates remote booting of client devices by employing virtual disk emulation and, in certain preferred embodiments, broadcasting or multicasting of data residing on a network server which is necessary to appropriately boot and configure the one or more client devices, the data including hibernation, O/S and application files

BACKGROUND OF THE INVENTION

Computer networks are commonly used in offices or corporate environments to interconnect personal computers (PCs). With the growth of PC usage has come an increasing demand to share computer files and facilitate administration of each PC after installation. In a network comprised of many PCs, the cost to an organization of having an Information Technology representative physically visit and service each PC can be enormous. In order to reduce these costs, software and computer manufacturers have developed technologies aimed at maintaining software products centrally on a network server and then downloading the desired software, via the network, to each client PC.

Designers and manufacturers of embedded intelligent connected equipment are looking for ways to reduce cost and improve manageability & reliability, facilitate deployment and secure intellectual property within these devices. One way to accomplish this is to introduce the ability for the client PC to boot from the network. The purpose of a PC's boot process is to load the necessary operating system components, initialize the hardware devices and present to the user an application. This is a long process and one that under normal conditions needs to consider changes in hardware or software configurations, as well as changes in authorized users. Network booting is better suited to those situations wherein the PC's associated hardware is fixed and the client PC's role does not change frequently. Network booting allows for the removal of the client PC's hard disk and facilitates centralized management of software content. Because current network bandwidth (10/100 Mbs and 1 Gbs) does not approach the speed of a client PC's local hard disk, a remote "cold boot" of an operating system (O/S) in a client PC from a network server is not terribly efficient and can take a great deal of time. Furthermore, bandwidth and network server resources can be further degraded by the additional challenge of attempting to boot simultaneously scores of client devices (a "boot storm".) The lengthy time required to "cold boot" further distracts from the perception and behavior of a typical embedded device. Thus, what is needed is a scalable way to speed up booting of a plurality of client devices from a loading server in a network.

Basic input/output system (BIOS), PC and O/S manufacturers have introduced a technique called "hibernation", whereby the current state of the PC memory & state of all devices are saved to disk and then restored at some future time. Hibernation had been used primarily in notebook PCs in order to conserve battery power. For example, a notebook PC configured for "Hibernate mode" will save its state to its local hard drive and power off when its lid is closed or after a period of inactivity, and then restore itself when the lid is re-opened. The net effect is to conserve battery power, with an advantageous side effect of returning the PC to the state prior to hibernation more quickly than if the client PC were to undergo a full "cold boot." When power is reapplied to the notebook, the notebook will load a very small portion of the O/S. The O/S will check if a valid hibernation image exists. If a hibernation image exists, the O/S then will copy back into PC memory the memory contents saved to the hibernation file. If a hibernation image does not exist, then a normal "cold boot" process is commenced. Note that a hibernation "resume" using a hibernation image has an advantageous side effect of returning the PC to the desired state more quickly than if the PC were to undergo a "cold boot", due in part to less required data initialization.

U.S. Pat. No. 6,101,601 to Matthews, et al., discloses an approach to resolving the long boot time associated with remotely booting a client device from a boot image in a network. However, that patent teaches resuming, following a reset of some kind, from a hibernation image stored on each client PC's local storage media. This approach requires any reconfiguration of the desired state of the PC to be performed prior to the hibernation of the client PC, and could possibly run afoul of network bandwidth problems as the server individually transfers a plurality of hibernate images to a corresponding plurality of client PCs in networks with large numbers of client PCs.

U.S. Pat. No. 5,974,547 to Klimenko teaches an apparatus for and method of using disk emulation for booting a 32-bit PC operating system (O/S) on a client computer through a networked connection to a server. In particular, that patent teaches a method of switching (on each disk I/O call) between the 32-bit protected mode processing of Windows 9x O/S's and the 16-bit real mode used by the BIOS, often referred to as "thunking", until the client's O/S is able to perform networking on its own. The method and apparatus presented therein is particularly suited to booting an O/S such as Windows 95® from a server by downloading a complete image of the software applications desired on the client PC, including the O/S. However, that patent does not take advantage of the Hibernate function available on later versions of Microsoft Corporation's O/Ss, namely Windows 2000®, and Windows XP®, which run in protected mode. Nor does it address another feature of the present invention, the use of multicasting of desired data, which in certain preferred embodiments includes a Hibernation file, to a plurality of client PCs in the network.

SUMMARY OF THE INVENTION

The present invention provides a system for and method of booting an O/S on one or more client PCs from a hibernation image stored on a network server employing virtual disk emulation.

In accordance with certain preferred embodiments of the invention, data necessary for the boot process to proceed, such as a hibernation file including a hibernation image and several O/S files, may be synchronously streamed from a network server as described below and in co-pending patent application Ser. No. 10/124,877 entitled "System for and Method of Streaming Data to a Computer in a Network", filed Apr. 18, 2002, and assigned to the assignee of the present invention. The contents of that application are hereby incorporated by reference in their entirety.

The one or more client PC's each operate an O/S which supports hibernation, such as Microsoft Windows 2000® and XP®. Inventive software drivers operate so as to support resuming each client PC to a usable state, in part by accepting from the network server a plurality of sectors (data packets), which collectively comprise the hibernation file. Requests for disk access in the early stage of the boot process will initially be redirected to the network server from each client using the PXE service. The PXE code will establish the initial virtual connection between each client and the server, allowing the server to be seen as another client drive. The PXE code facilitates downloading of additional emulation code, which in turn downloads O/S code that facilitates downloading of the hibernation file. During early phases of the boot process, insufficient O/S components have been loaded and activated to provide client O/S supported network access. Consequently, client hard disk access requests are handled through the Int 13h handler and the downloaded emulation code. Roughly 25% through the boot of the O/S, the O/S will assume control over communications with the server using the inventive drivers, effectively bypassing the need for the BIOS Int 13h services.

In other embodiments, the data downloaded from the network server may be retrieved in a predetermined manner from a plurality of sectors of a storage device associated with the network server. During operation, the one or more client PC's may issue a number of requests for a download of the plurality of sectors. The requests are forwarded to the server, which transparently emulates operation of a local disk at each of the client PCs. In one embodiment, the network server broadcasts to each of the requesting clients the desired data from a virtual hard drive associated with the server. In yet another embodiment, the network server multicasts to each of the requesting clients the desired data from a virtual hard drive associated with the server. The server preferably accepts download requests during a predetermined invitation period, prior to multicasting.

In certain embodiments, the emulation is effected by executing emulation code resident on each of the client PCs. Preferably, the emulation code is pre-execution boot environment (PXE) code resident on a network interface card (NIC) of each client PC. In alternative embodiments, the emulation is a result of inventive boot code downloaded from the network server which when executed assumes disk access control by an interrupt handling procedure (Int 13h) and requests the desired data. And in yet another embodiment, the emulation is effected at each client PC by executing portions of the O/S (preferably Windows 2000, NT or XP®) and two inventive drivers downloaded from the network server, which similarly assumes control of the client's network interface and generates requests for desired data.

Streamed data may be multicast in burst mode or broadcast from the network server to client PC's requesting a download. Therefore, the data need only be sent once rather than redundantly to each client PC. As data sectors are received at each client, they may be queued into a data cache pre-allocated by the inventive drivers. This advantageously allows each client to concern itself with other activities, such as initializing O/S data structures, drivers and/or applications.

The invention advantageously requires less hardware because the client devices may be configured without hard disks. The invention also allows all client PCs to boot the same hibernation image. This translates to easier maintenance of individual client devices since each client is no longer running unique copies of the O/S or the applications. For example, a software upgrade need only be performed on a single hibernation image as opposed to any number of individual client PCs. Considering that the hibernation image may be multicast to a plurality of clients, network traffic will be considerably reduced during peak traffic times, such as when a great number of clients are attempting to boot together. The solution provided herein is highly scalable, as very few additional system resources will be necessary to boot an increasing number of client PC's.

DETAILED DESCRIPTION OF CERTAIN EMBODIMENTS

Certain preferred embodiments of the invention will now be described with reference to the accompanying drawings.

As used in the description that follows, the term "hibernate" generally indicates that a PC's power is turned off in such a way that the PC is "paused." While the PC is off, power is removed from all or most of its components. And when the PC is turned back on or "resumed", it is returned to normal operation in the same state in which it was turned off. A "hibernate function", such as is described in U.S. Pat. No. 6,209,088 assigned to Microsoft Corp.®, is to be invoked just prior to turning off the PC, interrupting all program execution and saving all PC state information to a "hibernate image" in non-volatile storage. A "resume function" executes from volatile memory, implemented by code that is typically executed from the same executable address space that is used by the O/S and/or application programs initiated by the O/S. In particular embodiments of the invention described below, a "hibernate file" may also comprise O/S files such as O/S drivers and initialization files which are read into the PC's volatile memory prior to initiating the hibernate function.

As used herein, the terms "MBR" (Master Boot Record), "storage driver", and "network filter driver" refer to bootstrapping software modules developed by the Applicants. In order to differentiate software modules developed by persons other than the Applicants, a convention of preceding such modules' names with "O/S" has been adopted. Also, the terms "virtual drive", "boot drive" and "server drive" are used synonymously in the description, which follows.

Figure 1:
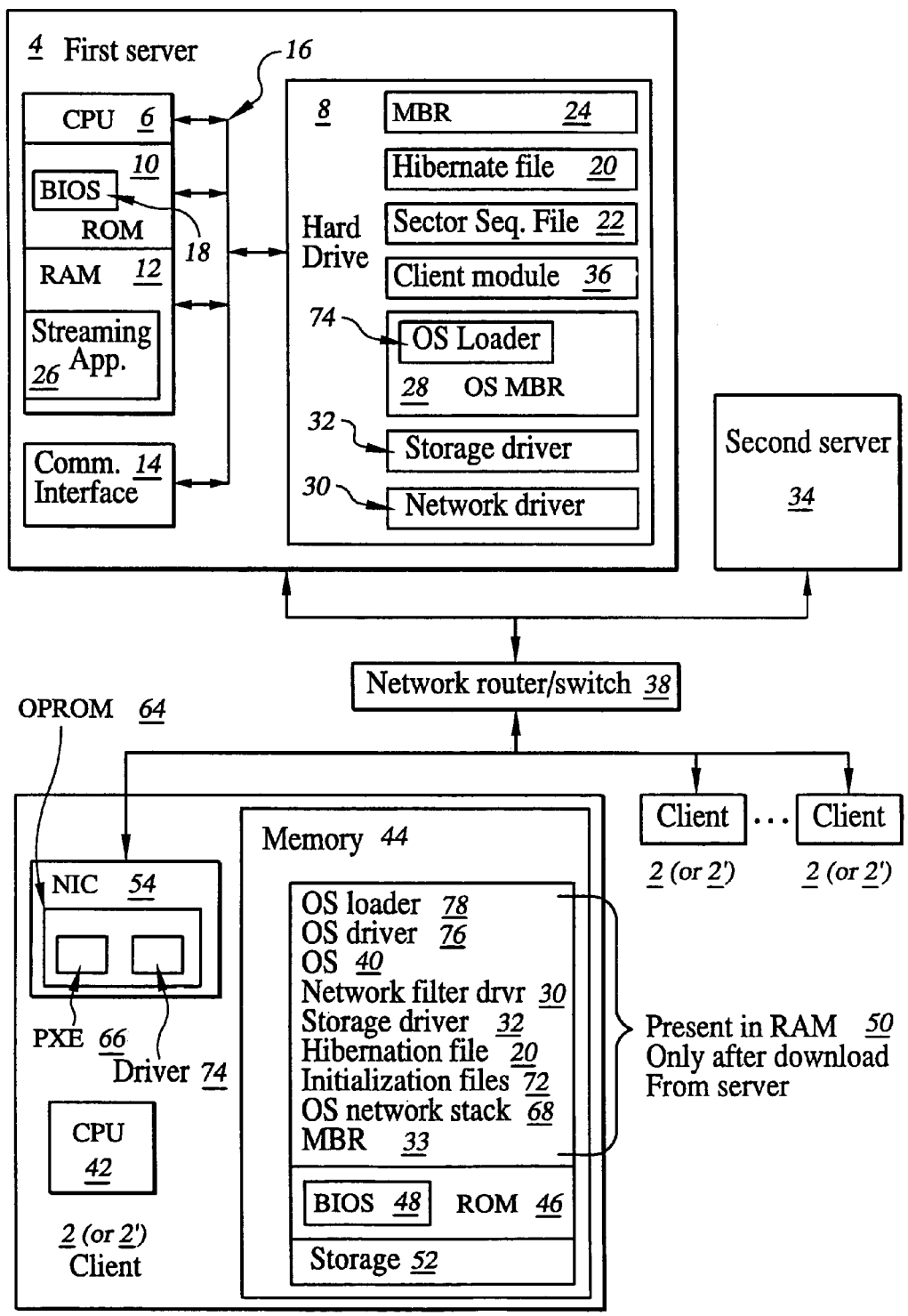
FIG. 1 is a block diagram illustrating a client/server network environment in which the present invention may be practiced.

The networked computing environment shown in FIG. 1 may be an enterprise network or client/server configuration, in which any one of the PC's 2 may function as a file server or network server 4. Network server 4 may be any ordinary type of system, from a relatively small PC to a large mainframe. In the particular embodiments described below, server 4 is a mid-range computer comprised of one or more central processing units (CPUs) 6, a hard drive 8, read only memory (ROM) 10 with its own BIOS 18, random access memory (RAM) 12, and a network adaptor 14 all coupled together by one or more busses 16. Those skilled in the art will recognize that the BIOS 18 is a set of basic routines that helps to transfer information between elements within the network server. In certain embodiments described below, the network server hard drive 8 stores files, such as a hibernation file 20 comprised of a hibernation image and particular O/S files, a sector sequence list 22, as well as numerous sets of microinstruction code, such as a MBR 24, a streaming module 26, and an O/S MBR 28 including at least a network filter driver 30 and a storage driver 32.

Optionally, one or more additional servers 34 may be coupled to the network and may communicate with the first server 4 and client PCs 2. In a multi-server network, a client module 36 (e.g., HPPC) may also reside on the first server 4 and, in response to requests from client devices 2, specify which additional server 34 contains client addressing information and download information.

The one or more client devices 2 are coupled to the server 4 through a network router or switch 38 in the network. Physical links may assume any of a number of conventional forms, such as cables, switched telephone lines, wireless devices including those operating in radio and infrared spectra, and many others. The client devices and server transfer data to one another using standard network communications protocols. An O/S 40 which supports hibernate functionality, such as Microsoft Windows 2000® and/or Windows XP®, manages the physical facilities of each client device 2 when a sufficient number of O/S modules and O/S drivers are activated. Each client device is similarly equipped with a CPU 42, such as the x86 family of microprocessors manufactured by Intel Corporation. Each client also includes local memory 44 including ROM 46 storing a BIOS 48, and RAM 50, local storage 52, and a network adapter 54 which are coupled to the CPU by a system bus 56.

FIG. 1 also illustrates a portion of the client's RAM 50 after a sufficient number of sectors have been downloaded and the code they comprise executed. As shown, RAM 50 may contain a downloaded O/S 40, O/S drivers 76, O/S loader 78, network filter driver 30, storage driver 32, and O/S network stack 68. In some embodiments RAM 50 also contains a hibernation file 20 and a copy of a kernel binary providing system utility functions, such as WIN32.SYS 72.

Figure 2:
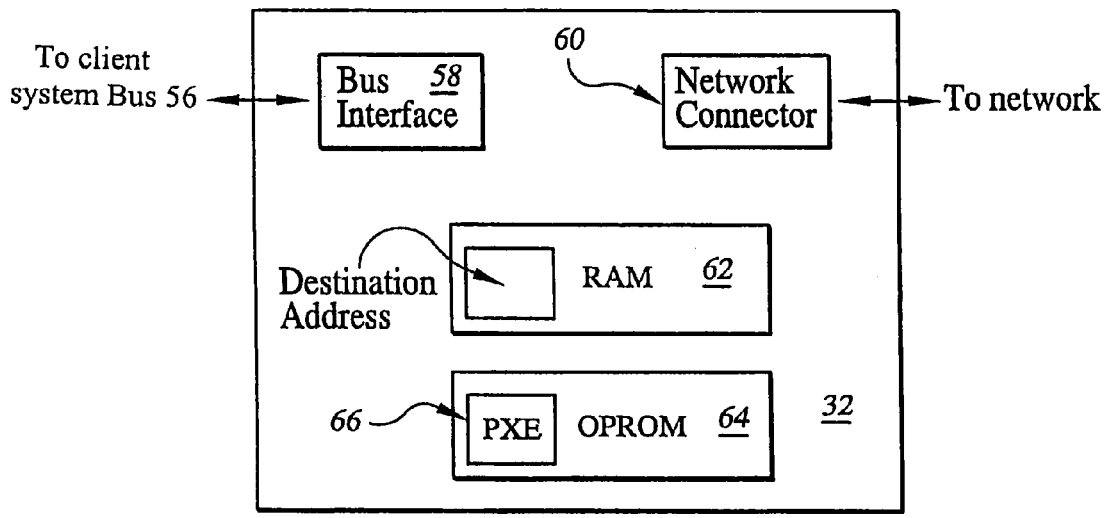
FIG. 2 is a block diagram illustrating a network adapter in accordance one embodiment of the present invention.

Now referring to FIG. 2, the network adapter 54 of each client is preferably a network interface card (NIC) that provides a data link between the hardware of the client and the network. Each NIC 54 includes a bus interface 58 for connecting to the client system bus 56, and one or more network connectors 60 for connecting to the network, which may comprise a LAN or WAN. Also included on the NIC 54 is random access memory (RAM) 62 for storing the unique destination address of the NIC, as well as an Option ROM (OPROM) 64 storing PXE emulation code 66. The destination address enables each client 2 to be individually addressed by any other computer in the network.

BootNIC Basic Architecture

The present invention provides a system and method, referred to by the Applicants as BootNIC technology, that in one aspect allows O/S's which support a hibernate function, such as Windows 2000 and Windows XP, to be booted over a network, and in another aspect enables synchronous streaming of data on O/S's which support hibernation and those that do not. As each client boots, it will initially communicate with the server 4 using PXE service. PXE code 66 will establish an initial emulated "virtual drive" connection between each client and the server. PXE services allow MBR code 33 to pass read requests to the server, thereby allowing a hibernation file 20 residing on the server to be seen by each client's CPU 42 as a plurality of data sectors which could be stored on a local client hard drive 52. During the early stages of the bootstrapping, emulation is provided by real mode execution of the MBR code 33, since the BIOS interrupt handler services operate only in real mode. Later in the process, emulation is provided by the O/S kernel code and the storage driver 32 and network filter driver 30 which execute only in protected mode (no "thunking" occurs.)

Figure 3:
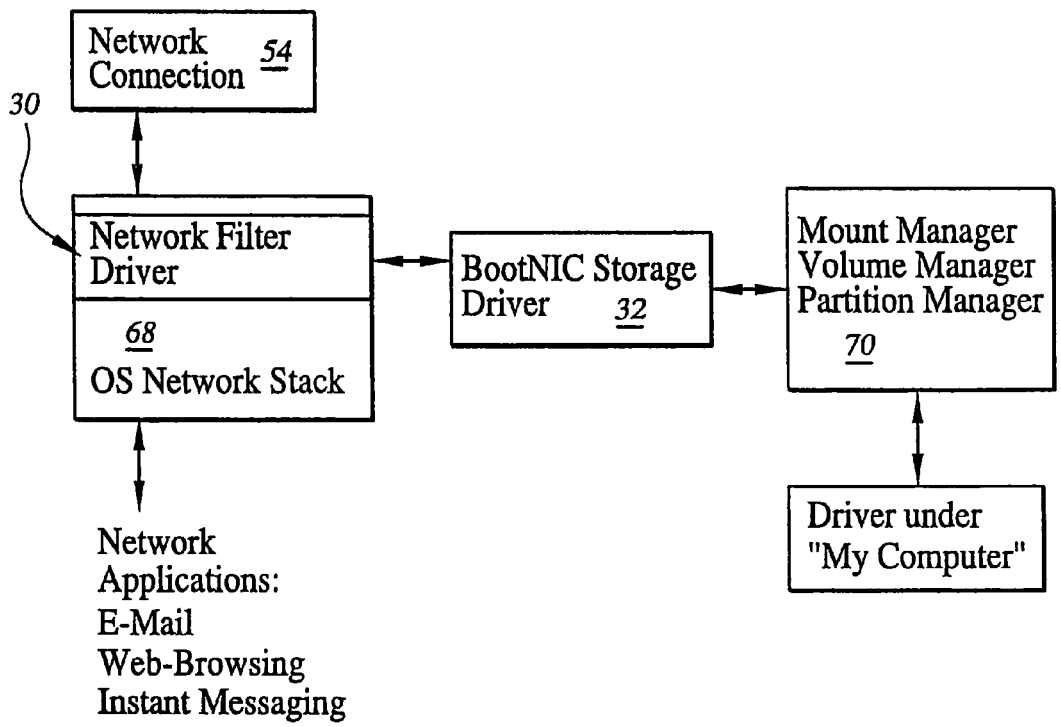
FIG. 3 is a block diagram illustrating an embodiment of a portion of a client's local memory after the inventive drivers have been downloaded from a network server and executed.

FIG. 3 illustrates in block form a portion of a client's local memory 44 after the network filter driver 30 and storage driver 32 have been downloaded from the network server 4 and executed. The sole responsibility of the network filter driver is to monitor all data packets being passed from the network through the client NIC 54 to the O/S network stack 68 for those packets that are BootNIC specific, and intercepts said specific data packets from being passed further down the network stack 68 and instead passes these packets to the storage driver 32. The storage driver 32 will in turn communicate with Windows' various Managers 70 responsible for storage such as the Mount Manager, Volume Manager, and Partition Manager. If a network data packet is not BootNIC specific, then the data packet is passed down the O/S network stack 68 untouched. Those skilled in the art will appreciate that there are three different types of data packets: (1) broadcast packets, which are packets that are addressed to every computer in the network; (2) multicast packets, which are packets that are addressed to more than one, but not necessarily all, of the computers in the network; and (3) directly addressed packets, which are packets that are addressed to a specific client device only. A system according to the present invention may employ any or all of these data packet delivery approaches.

The present invention takes advantage of the widely adopted specification known as Pre-Boot EXecution Environment (PXE), which is a result of an effort to create a predictable, interoperable way for clients to interact with a network in a pre-boot environment (with or without an operating system). The current version of PXE was established as a subset of the Intel®-driven industry initiatives of Wired for Management (WfM). PXE embodies three technologies that establish a common and consistent set of pre-boot services with boot firmware of Intel® Architecture-based systems: (i) a uniform protocol for clients 2 to request the allocation of a network IP address, and subsequently request the downloading of a network bootstrap programs (MBR 24 and O/S MBR 28) from a network boot server 4; (ii) a set of APIs available in the pre-boot firmware environment of the client 2 that constitute a consistent set of services that can be employed by the BIOS 48 or bootstrap programs; and a standard method of initiating the pre-boot firmware to execute the PXE protocol on a client PC.

The use of the PXE specification allows, among other things, each client's NIC 54 to serve as a boot device. It also allows the BIOS 48 to make direct use of the NIC code stored on the OPROM 64 before and during the POST process. The present invention, in certain embodiments, optionally takes advantage of the PXE feature of boot server discovery. Using this feature, the booting client 2 can discover an appropriate boot server 4 or 34 from a list of available boot servers provided to the client 2 during the initial phase of the remote boot. Boot server types, or specific hibernate images for download, can be assigned and maintained by an information technology administrator based on the client's system architecture type or even each client's unique ID. PXE uses Dynamic Host Configuration Protocol and Trivial File Transfer Protocol to communicate with the server 4. When a PXE enabled client boots, it obtains an IP address from a DHCP server 4. The client 2 may then discover the DHCP server 4, which provides the client with a list of boot servers. In FIG. 1, an additional server 34 is shown, which could act in the capacity of a boot server. However, in order to facilitate the explanation of the invention, the processes that result in booting from a hibernation file and broadcasting or multicasting are described in the context of single server 4 network configurations.

Remote Booting from a Hibernation Image

As mentioned previously, the present invention provides a system for and method of booting an O/S to one or more clients 2 from a server 4 storing a hibernation image 20 having O/S files for the client PC's. Each client's CPU 42 executes instructions only from addressable memory such as DRAM or some other type of volatile, electronic memory. In order to initialize this addressable memory, a small amount of PXE code 66 is provided in an OPROM 64 on the NIC 54. The PXE code 66 allows a request to be issued, to the network server 4 emulating a client local disk, to read the MBR code 24. The downloaded MBR code 33 enables further disk emulation, and requests an initial portion of the O/S MBR 28, to be transmitted from the server to the client, where it is loaded into DRAM. The O/S MBR 28 is then responsible for downloading and initializing remaining portions of the O/S, which in turn download the hibernation file 20. Although the following description involves a single hibernation file 20 which is downloaded to a plurality of clients, one skilled in the art will readily appreciate that numerous hibernation files could potentially be streamed to different sets of clients using the present inventive method. The Applicants have observed that their inventive method reduces by over 50% the time required to boot an O/S 40 over a network, as opposed to a standard O/S local boot.

The hibernation transaction protocol consists of two halves. The first half comprises generating the hibernation image on the boot drive 8 and the second half is the actual resume from the hibernation image.

Prior to starting the inventive boot up process, the hibernation file 20 residing on the server 4 is generated in a straightforward manner. Once a client PC is configured to a desired state, the hibernate function is employed to create a hibernation image in the hibernation file 20. The hibernation file 20 is then transferred to the server's boot drive 8. Alternatively, the hibernation process could be executed such that the hibernation file is saved directly to the server boot drive 8. Although the hibernate function instructs all drivers to power down, the storage driver 32 only does so at the request of the O/S, after caching WIN32.SYS 72 into local memory 50 and writing the memory contents to the file HIBERFIL.SYS (the file O/S loader checks for validity upon resuming). Another step preferably performed prior to initiating the boot process is storing on the boot drive 8 the MBR 24 emulation code.

The architecture of Windows® requires two drivers, the storage driver 32 and network filter driver 30, in order to communicate with the server rather than only one, because drivers are required to take on a "type" and one driver cannot simultaneously be a storage driver and a network driver. Windows 2000 and XP's implementations of hibernation assume only one O/S driver will be required to communicate with the storage device, and, accordingly, provide no mechanism to allow the hibernation process to support more than one O/S driver. Presently available standard O/S drivers will not work because they have never been written to resume from a file over a network. In the standard resume from a local drive, an O/S storage driver is only required to (and only does) know how to communicate with the local hard drive.

The storage driver 32 "hooks" into the dispatch routines of the NIC driver 74 by replacing the dispatch address for a power handler in the NIC driver 74 with the storage driver's own handler. The storage driver 32 may then call the original NIC driver power handler routine.

The booting process is comprised of many steps, but generally speaking involves one program starting another, each more intelligent than the one before. The major steps of the present inventive method are the BIOS initialization, PXE initialization, the MBR loading and Int 13h redirection, the loading of the hibernate image, and the O/S resume. Note that this solution is specific to Windows 2000; however, the steps listed below encapsulate a generic framework for extending the solution to other operating systems.

Figure 5:
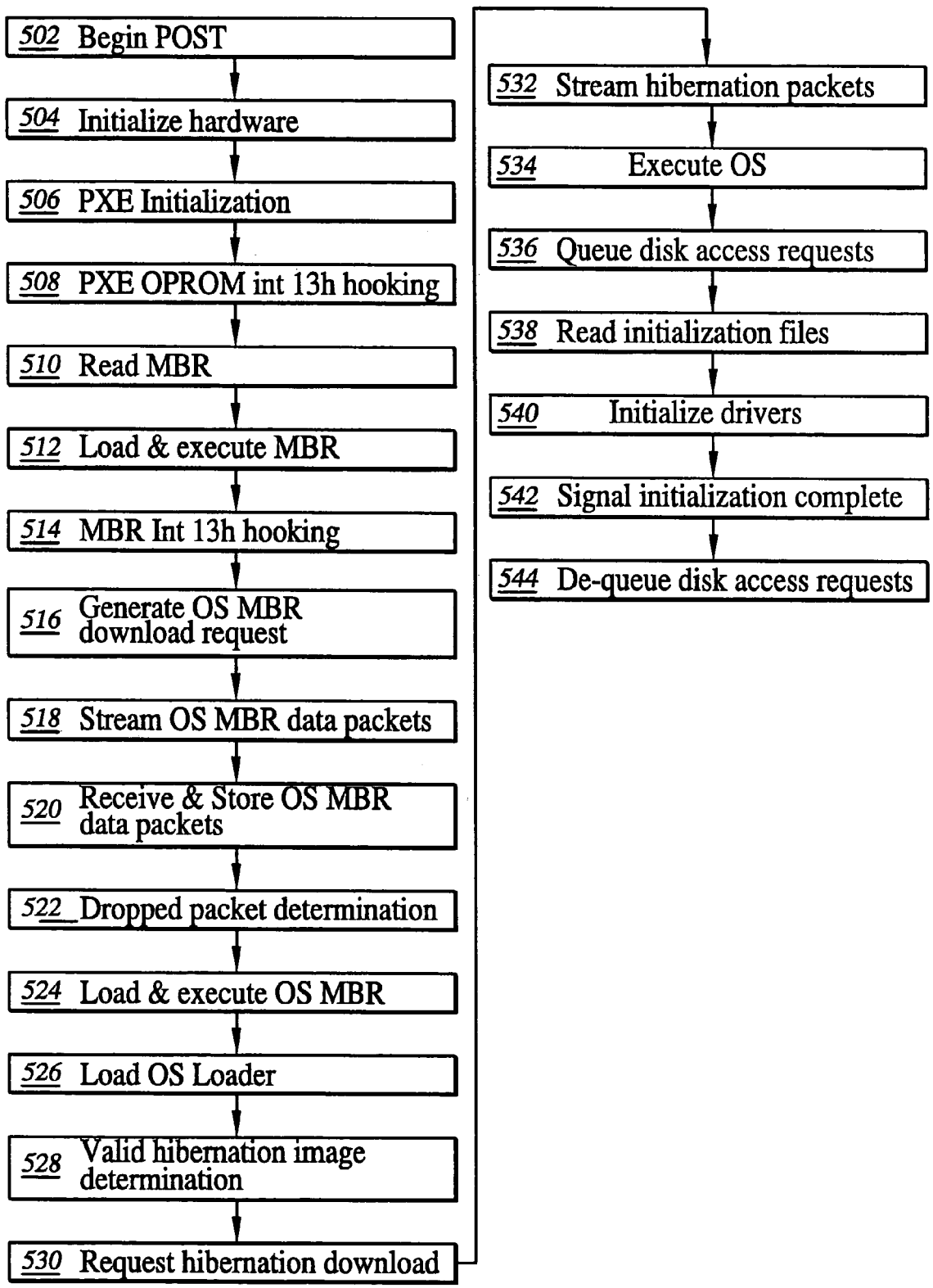
FIG. 5 is a flowchart illustrating an embodiment of the remote network booting process employing a hibernation image file.

With reference to FIG. 5, upon powering up, the BIOS 48 initialization of client 2 immediately begins with the execution of a power-on/self-test (POST) sequence (Step 502). Each client broadcasts a DHCP discovery request to ascertain its own IP address. The server's O/S, which supports this protocol (and others), returns these parameters as well as the address of a server to boot from, which may or may not be the network server 4. The virtual boot drive 8 may comprise any nonvolatile storage device associated with the network server 4 (or alternative boot server 34). Types of drives could include floppy disks, hard disks, magnetic tape, DVD's, CD-ROMs, and flash ROMs. To be a virtual boot drive 8, a device should hold a copy of a hibernation file containing O/S files, or microinstruction code that is intended to be downloaded.

During the POST, the CPU 42 checks addresses on the bus 56 to determine if an OPROM 64 is present on the client 2. If it finds an OPROM, the CPU processes any hardware initialization routines located on the OPROM, which initializes the NIC 54 (Step 504) to a usable state. The OPROM code then initializes the PXE code 66 (Step 506). The OPROM code also "hooks" into the BIOS boot process through the interrupt 13h handler services (Step 508) which controls reads and writes to the hard drive 52. By using the PXE code and assuming control over the NIC 54, the OPROM 64 code communicates with the server 4 and allows the server's hard drive 8 to transparently emulate a local disk drive 52 of the client 2 through redirection of disk reads and writes to the server.

At the end of the POST sequence, the BIOS 48 will start the booting of the O/S. The BIOS reads the first sector (cylinder 0, head 0, sector 1) of the server's virtual drive 8 (Step 510). The first sector stores the MBR 24 (Master Boot Record) that contains additional emulation code to boot the O/S 40. The MBR 24 code is traditionally provided by the O/S manufacturer, but in order to facilitate the hibernation resume process described below, it was necessary to develop additional emulation code. The MBR code is executed after being loaded into client memory (Step 512). The MBR code continues to use PXE 66 to communicate with the network server, and hooks interrupt 13h in order to capture all storage access requests, preventing writes to the server's virtual hard disk 8 (Step 514) during the early portion of the boot process.

Read requests may be satisfied by broadcasting the desired data from the virtual drive. However, in certain preferred embodiments, read requests are satisfied using a synchronous streaming method 400 described below. Alternatively, read requests may be processed individually by the network server. Read requests are not passed to the original Int 13h BIOS routine, but instead PXE is used by the MBR to receive data from the network server 4. Read requests are satisfied by the MBR code, and requests are then returned to the requestor with the data downloaded from the network server 4. Disk writes are handled differently. The MBR code does not perform writes, but returns a successful write indication to the disk write requester. Writes are also not passed to the original Int 13h BIOS routine.

The MBR code then proceeds to download an O/S MBR 28 developed by the O/S manufacturer, shown in FIG. 1 as "Windows 2000 MBR". The MBR code 88 at each client 2, through its hooking of the Int 13h vector, captures all requests for local disk reads before the OPROM 64 has an opportunity to see the requests. The downloaded MBR 88 then forwards, using PXE 66, the requests to the network server (step 516) to download the O/S MBR 28.

In step 518, the network server 4 may either broadcast or synchronously stream data packets that collectively comprise the O/S MBR 28 from the server's virtual drive 8 to each client 2 requesting the O/S MBR download. Synchronization may be accomplished using the synchronized streaming process 400 described below. In these embodiments, streaming module 26 registers for download all clients 2 which make an O/S MBR download request during an invitation period. The invitation period may consist of a predetermined time period that gives all clients an opportunity to register. The streaming module 26 then designates a first client as a Read Requestor. That is, only that client will be allowed to make a read request of the streaming module 26 to multicast to all the registered clients the contents of the next data sector. The streaming module 26 then accesses and multicasts to each of the registered clients 2 the identity of the Read Requestor and the contents of a first sector of a group of sectors on the virtual drive 8 which collectively store the O/S MBR 28. The streaming module will then determine if all sectors of the O/S MBR group of sectors have been multicast. If more sectors are required to be multicast, the streaming module will designate a new Read Requestor client, provided, of course, that there is more than one registered client. Next, the streaming module accesses the next sector and multicasts its contents with the identity of the new Read Requestor to each of the registered clients. The step of designating a new Read Requestor is preferably performed in a round-robin fashion, whereby one registered client following each sector multicast round will in turn have responsibility for generating a virtual drive read request while the non-designated clients simply wait for multicast data. This streaming process 400 is repeated until the entire O/S MBR 28 has been multicast and subsequently loaded at each client, at which time the downloaded O/S MBR takes control of the network interface 54 and request generation process.

Note that each read request, regardless of which registered client it has come from, will be identical. The read requesting effected by the MBR code may, therefore, proceed in a lock-step fashion. Each read request will be identical because each client will be requesting a read from the same virtual drive and executing the same MBR 28 already downloaded from that virtual drive.

Referring again to FIG. 5, in step 520 each registered client has received and stored the broadcast or multicast O/S MBR sectors. The received data sectors are stored in RAM 50, in a portion of memory reserved in the extended BIOS data area. Each broadcast or multicast sector is sent with a sequential number. Each client may then determine (step 522) whether the client successfully received all the sectors that were transmitted. If a client is missing a data packet, the client will then asynchronously request from the network server the missing data sector. This data, though, will only be returned to that individual client and not broadcast or multicast to all the registered clients.

In step 524, the O/S MBR 28 (e.g., Windows 2000 MBR) is loaded into each client's memory 50 and executed. The O/S MBR in turns downloads from the virtual drive an O/S loader 74 (e.g., file NTLDR) (step 526) written by the O/S manufacturer. The downloaded O/S loader 78 will check if a valid hibernation image 20 exists on the virtual drive 8 (step 528). The virtual drive has previously been set up to contain the valid hibernate image 20. The O/S loader 78 then begins to load the hibernate image through a series of Int 13h read requests that the MBR 33 will capture and redirect to the network server 4 (step 530). The streaming process 400 may again be deployed, on this occasion to access and broadcast or multicast the contents of a plurality of sectors on the virtual drive 8 that collectively store the hibernation file 20 (step 532).

Once the hibernate image has been copied to each client's local memory 44, the O/S loader 78 passes execution to the O/S 40 restored from the hibernation image, i.e., Windows XP or 2000 (step 534). Note that, from this point forward, that read requests are not performed in a synchronous manner. Rather, they are transmitted to and answered by the network server on an individual basis.

The O/S 40 now needs to begin waking drivers 76, such as storage driver 32, and to perform some initialization to bring the system back to a usable state. In order to configure each client 2 to load the storage and network filter drivers in the proper order, several standard driver registry settings for existing drivers must previously have been modified (e.g., using the regedit32 registry editor) as described in the table below.

| Key/Value Name | Type | Data |
|---|---|---|
| HKEY_LOCAL_MACHINE\SYSTEM\CurrentControlSet\Services\NDIS | | |
| Start | REG_DWORD | 0 |
| Tag | REG_DWORD | 1 |

-continued

| Key/Value Name | Type | Data |
|---|---|---|
| HKEY_LOCAL_MACHINE\SYSTEM\CurrentControlSet\Services\NIC-device | | |
| Start | REG_DWORD | 0 |
| Tag | REG_DWORD | 2 |
| Group | REG_SZ | NDIS |
| ImagePath | REG_EXPAND_SZ | System32\drivers\NIC-driver-name.sys |
| HKEY_LOCAL_MACHINE\SYSTEM\CurrentControlSet\Control\ServiceGroupOrder | | |
| List | REG_MULTI_SZ | Modify existing value so the "NDIS" and "NDIS Wrapper" entries appear on the second line, right after the "System Bus Extender" line. |

One difficulty encountered here is that the storage driver 32 must prevent any reads or writes until the NIC driver 74 and network filter driver 30 have been initialized. However, the network filter driver will not be initialized until the O/S 40 has read the file WIN32K.SYS 72, a kernel binary providing system utility functions, such as low-level routines for displaying and printing. This problem has been solved by the early caching of WIN32.SYS into client memory 50 before creating the hibernation image, thereby making the file a part of the hibernation image itself that has now been read into local memory 50. Thus, the file WIN32K.SYS can be read from local memory without accessing the virtual drive 8. With one exception, the storage driver 32 queues all O/S disk write and read requests into a cache also previously allocated during the creation of the hibernation image, and now in the client system's memory 50. The storage driver 32 simply stores the requests until it's safe to allow the requests to be processed, i.e., after the NIC driver 74 and network filter driver 30 have been initialized (step 536). The file WIN32K.SYS is read from local client memory and the data is returned back to the O/S (step 538).

The O/S 40 then awakens the NIC driver 74 and network filter driver 30 (step 540). In step 542, the network filter driver 30 informs the storage driver 32 that the NIC 54 has been initialized and that the network filter driver 30 is ready to accept the pending read and write requests. Alternatively, the storage driver 32 may have previously (during the creation of the hibernation image) "hooked" into the NIC driver 74 dispatch function, monitoring its data for "IRP_MJ_POWER". This alerts the storage driver 32 when the network drivers have been awakened. Once the O/S 40 transmits IRP_MJ_POWER to the NIC driver 74, the request will always be for full power-on (i.e., the NIC is in a completely usable state). The storage driver 32 will wait for the NIC driver to finish processing the IRP_MJ_POWER, which then means the network drivers have been fully awakened.

In step 544, the storage driver then de-queues all the cached read and write requests to restore the O/S 40 to a usable state, after which a user may use the client PC in the normal manner. Note that in this embodiment the storage driver handles reads and writes slightly differently. That is, the storage driver caches locally all writes so that the writes are never committed to the virtual driver, in order that different clients do not simultaneously write to the same virtual image and corrupt it. Conversely, reads are actually read from the virtual drive unless a copy of the needed sector has already been cached on the client. In the latter case, the sector is read from the cache in the client's memory and no network transaction takes place.

Synchronous Streaming of Desired Data to a Plurality of Clients

In certain preferred embodiments, data necessary for the boot process to proceed is synchronously streamed, as described in co-pending patent application Ser. No. 10/124,877 entitled "System for and Method of Streaming Data to a Computer in a Network," filed Apr. 18, 2002, from the server 4 to the one or more clients 2. An inventive system in accordance with these embodiments employs transparent local disk emulation and broadcasting or burst mode multicasting of the contents of a set of data sectors residing on the server's "virtual" drive 8 in response to read requests issued by the one or more clients 2.

Figure 4:
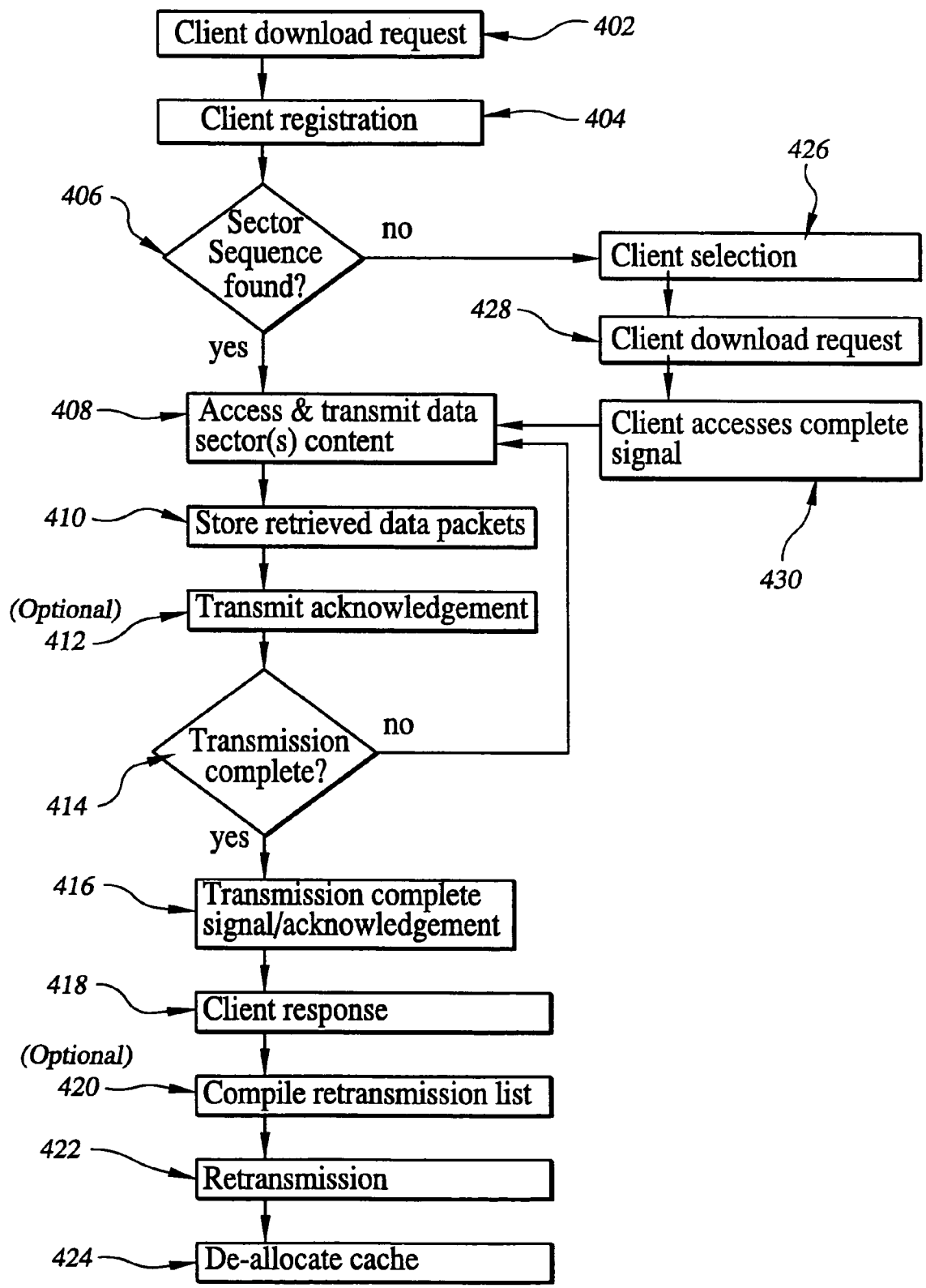
FIG. 4 is a flowchart illustrating an embodiment of the synchronous streaming process in provided by the present invention.

FIG. 4 flowchart illustrates a process 400 for synchronous data streaming. Note that in order to complete a network boot of an O/S on a client using a hibernation file, the synchronous streaming process 400 is basically employed twice (with some significant differences), once before and once after the O/S drivers are initialized. This occurs because the O/S boot process uses interrupt handler processes to download files from the virtual drive 8 during the early portion of the boot process, but later uses the storage driver 32 and network filter driver 30 after they are initialized. This necessitated the need for two solutions to perform essentially similar tasks.

Each client desiring to download particular data issues an initial request. Desired data may comprise boot programs, hibernation files, O/S files, or any application files residing on the server virtual drive 8. These requests are issued to the server 4, while the server emulates a client's local disk 52, at various stages of boot up, either through the execution of the PXE code 66 and downloaded MBR 33 code, or through execution of O/S MBR 28 code in conjunction with the network filter and storage drivers (step 402).

In step 404, the streaming module 26 of the server registers each client issuing an initial request during a predetermined invitation period. Each registered client now waits and listens for data packets from the streaming module 26.

In step 406, the streaming module looks for a sector sequence file 22 on the server 4. The sector sequence file 22 determines the order in which the streaming module may access and broadcast or multicast data sectors containing the desired data. If a sector sequence file 22 is not found, program flow passes to a learning process 450 for recording a sector sequence file as described below.

In step 408, if a sector sequence file 22 is found, the streaming module 26 will then proceed to broadcast or multicast the desired data to the registered clients. Data packets are preferably broadcast or multicast at a fixed rate.

At each registered client 2, received data packets are stored into fixed-length queues in order to compensate for differences in the broadcast or multicast rate and client boot process speed (step 410). The network and storage drivers handle streaming differently than the early MBR/Int 13h hooking processes. The drivers will load the data into a large, temporary section of memory (a "data cache") that they have pre-allocated on each client. Each registered client keeps track of which data packets it has successfully received. Optionally, each registered client may transmit to the server an acknowledgement that the most recent N number of packets have been attempted to be successfully received. (step 412) The goal of the client acknowledgments is to ensure that the local client buffers are not overrun.

In step 414, the streaming module 26 determines if all the desired data sectors have been accessed and their contents transmitted. If not, then steps 408 and 410 are repeated until this is accomplished. If all the desired data has been transmitted, the streaming module broadcasts or multicasts a message indicating the transmission is complete (step 416). At this point, not every client may have received all the blocks of information successfully. Some might have dropped packets due to various reasons. Some may have missed the beginning of the transmission. In step 418, each of the clients 2 will respond to the streaming module 26 with a message indicating success or the need for retransmission of missing packets. The streaming module may then compile and efficiently orders a packet retransmission list (step 420). Alternatively, the packet retransmission list may be compiled repeatedly after each fixed number of bytes during data packet transmission (prior to step 414.) Retransmission may then occur (step 422) on an individual basis between the streaming module and the clients. As most clients will be busy processing their received data packet, network bandwidth will be high; therefore individual retransmissions should have no discernable effect on boot time or network traffic.

In step 424, after the downloaded data has been successfully processed, the memory previously reserved for the cache is de-allocated.

As mentioned above, an advantage of the streaming process 400 is that, at each client, while that client's O/S may be occupied with initializing O/S data structures, drivers, or applications, future data needs of the O/S will already have been met by preloading the data packets into memory before the O/S has the need for the data. The streaming module 26 broadcasts and/or multicasts packets to the clients faster than the clients can utilize them, shifting the dependency of boot up time from the data packet transfer time to the client boot process time. In certain embodiments, the streaming module 26 employs the sector sequence file 22 in determining the order of virtual drive sector contents to be transmitted. It is expected that the sector sequence file 22 will have been stored on the server 4 prior to initiating the synchronous streaming process, but if this has not occurred, the sector sequence file 22 may be generated during the learning process 450 described below.

The learning process 450 is executed if the streaming module 26 cannot find the sector sequence file 22. The sector sequence file is comprised of a list of sectors that the O/S must read in order to complete the boot process. In step 426, the streaming module 26 selects one registered client. That client is permitted to boot conventionally, using the inventive MBR 24 and drivers (30 and 32), while the streaming module records in a new sector sequence file all sector access requests the selected client makes while booting (step 428). In step 430, the booting client informs the streaming module that it has completed booting. At this point, the new sector sequence file is stored on the virtual drive 8, and the streaming process is resumed at step 408.

Other embodiments of the invention will be apparent to those skilled in the art from a consideration of the specification or practice of the invention disclosed herein. For example, in some embodiments, the synchronous streaming process 400 may be used only in downloading data requested by the interrupt handler processes, or only in the protected-mode accesses of the server. Or the synchronous streaming process 400 may be employed in preloading applications into the clients. Similarly, in other embodiments, booting from a network copy of a hibernation image without the use of the MBR code to synchronize the request and receipt of data packets is within the scope of this invention. It is, therefore, intended that the specification and examples be considered as exemplary only, with the true scope and spirit of the invention being indicated by the following claims.

What is claimed is:

1. A method for booting a client computer to a predetermined state via a network, the method comprising:

issuing, by a client executing emulation code and client disk access interrupt procedures, a request for a first set of sectors of a virtual hard disk associated with a server computing device, the first set of sectors comprising a first boot file;

receiving, via the network, the first boot file from the server computing device;

executing the contents of the first boot file, the executing comprising:

installing a second client disk access interrupt handler procedure that intercepts a read request and a write request to a hard disk, forwards the read request to the server computing device, and caches the write request to prevent the write request from being executed at the virtual hard disk to preserve the state of the virtual hard disk; and issuing a second request for a second set of sectors that comprise a second boot file;

receiving, from the server computing device, the second boot file, the second boot file comprising an O/S boot file;

executing the second boot file, the executing comprising:

issuing a third request for a third set of sectors comprising a hibernation image;

receiving the hibernation image, the hibernation image comprising the contents of local memory, memory management information, and other state information needed to restore the client to the pre-determined operating state;

loading the hibernation image into client memory; and initializing drivers, data structures and applications associated with the O/S to thereby restore the client computer to the predetermined state.

2. The method of claim 1 wherein the second client disk access interrupt handler caches the write requests locally at the client.

3. The method of claim 1 wherein the second client disk access interrupt handler caches the write requests at a location on the network.

4. The method of claim 1 wherein the emulation code comprises PXE code resident on the client.

5. The method of claim 1 wherein initializing drivers comprises initializing a network filter driver and a storage driver to enable server emulation.

6. The method of claim 1 wherein receiving the hibernation image comprises receiving the hibernation image via the server.

7. The method of claim 1 wherein receiving the second boot file comprises, receiving the second boot file on a sector-by-sector basis.

8. The method of claim 7 further comprising requesting, by the client, retransmission of one of the sectors of the second boot file.

9. The method of claim 1 wherein receiving the hibernation image comprises, receiving the hibernation image on a sector-by-sector basis.

10. The method of claim 9 further comprising requesting, by the client, retransmission of one of the sectors of the hibernation image.

11. A computer readable medium having instructions thereon that when executed cause a client computer to boot to a predetermined state via a network, the computer readable medium comprising:
   instructions to issue, by a client executing emulation code and client disk access interrupt procedures, a request for a first set of sectors of a virtual hard disk associated with a server computing device, the first set of sectors comprising a first boot file;
   instructions to receive, via the network, the first boot file from the server computing device;
   instructions to execute the contents of the first boot file, the instructions to execute comprising:
      instructions to install a second client disk access interrupt handler procedure that intercepts a read request and a write request to a hard disk, forwards the read request to the server computing device, and caches the write request to prevent the write request from being executed at the virtual hard disk to preserve the state of the virtual hard disk; and
      instructions to issue a second request for a second set of sectors that comprise a second boot file;
   instructions to receive, from the server computing device, the second boot file, the second boot file comprising an O/S boot file;
   instructions to execute the second boot file, the instructions to execute comprising:
      instructions to issue a third request for a third set of sectors comprising a hibernation image;
      instructions to receive the hibernation image, the hibernation image comprising the contents of local memory, memory management information, and other state information needed to restore the client to the predetermined operating state;
   instructions to load the hibernation image into client memory; and
   instructions to initialize drivers, data structures and applications associated with the O/S to thereby restore the client computer to the predetermined state.

12. The computer readable medium of claim 11 wherein the second client disk access interrupt handler caches the write requests locally at the client.

13. The computer readable medium of claim 11 wherein the second client disk access interrupt handler caches the write requests at a location on the network.

14. The computer readable medium of claim 11 wherein the emulation code comprises PXE code resident on the client.

15. The computer readable medium of claim 11 wherein the instructions to initialize drivers comprise instructions to initialize a network filter driver and a storage driver to enable server emulation.

16. The computer readable medium of claim 11 wherein the instructions to receive the hibernation image comprise instructions to receive the hibernation image via the server.

17. The computer readable medium of claim 11 wherein the instructions to receive the second boot file comprise instructions to receive the second boot file on a sector-by-sector basis.

18. The computer readable medium of claim 17 further comprising instructions to request, by the client, retransmission of one of the sectors of the second boot file.

19. The computer readable medium of claim 11 wherein the instructions to receive the hibernation image comprise instructions to receive the hibernation image on a sector-by-sector basis.

20. The computer readable medium of claim 19 further comprising instructions to request, by the client, retransmission of one of the sectors of the hibernation image.

21. A system for booting a client computer to a predetermined state via a network, the system comprising:
   means for issuing, by a client executing emulation code and client disk access interrupt procedures, a request for a first set of sectors of a virtual hard disk associated with a server computing device, the first set of sectors comprising a first boot file;
   means for receiving, via the network, the first boot file from the server computing device;
   means for executing the contents of the first boot file, the means for executing comprising:
      means for installing a second client disk access interrupt handler procedure that intercepts a read request and a write request to a hard disk, forwards the read request to the server computing device, and caches the write request to prevent the write request from being executed at the virtual hard disk to preserve the state of the virtual hard disk; and
      means for issuing a second request for a second set of sectors that comprise a second boot file;
   means for receiving, from the server computing device, the second boot file, the second boot file comprising an O/S boot file;
   means for executing the second boot file, the means for executing comprising:
      means for issuing a third request for a third set of sectors comprising a hibernation image;
      means for receiving the hibernation image, the hibernation image comprising the contents of local memory, memory management information, and other state information needed to restore the client to the predetermined operating state;
   means for loading the hibernation image into client memory; and
   means for initializing drivers, data structures and applications associated with the O/S to thereby restore the client computer to the predetermined state.

22. The system of claim 21 wherein the second client disk access interrupt handler caches the write requests locally at the client.

23. The system of claim 21 wherein the second client disk access interrupt handler caches the write requests at a location on the network.

24. The system of claim 21 wherein the emulation code comprises PXE code resident on the client.

25. The system of claim 21 wherein the means for initializing drivers comprises means for initializing a network filter driver and a storage driver to enable server emulation.

26. The system of claim 21 wherein the means for receiving the hibernation image comprises means for receiving the hibernation image via the server.

27. The system of claim 21 wherein the means for receiving the second boot file comprises the means for receiving the second boot file on a sector-by-sector basis.

28. The system of claim 27 further comprising means for requesting, by the client, retransmission of one of the sectors of the second boot file.

29. The system of claim 21 wherein the means for receiving the hibernation image comprises means for receiving the hibernation image on a sector-by-sector basis.

30. The system of claim 29 further comprising means for requesting, by the client, retransmission of one of the sectors of the hibernation image.

* * * * *